(12) United States Patent
Bowen et al.

(10) Patent No.: US 9,562,831 B2
(45) Date of Patent: Feb. 7, 2017

(54) ROTARY WHEEL AIRTIGHTNESS DETECTING MACHINE

(71) Applicant: CITIC Dicastal Co., Ltd., Qinhuangdao (CN)

(72) Inventors: Xue Bowen, Qinhuangdao (CN); Guo Jiandong, Qinhuangdao (CN); Ren Yanchao, Qinhuangdao (CN); Liu Weidong, Qinhuangdao (CN); Wang Yongning, Qinhuangdao (CN); Zhu Zhihua, Qinhuangdao (CN); Li Changhai, Qinhuangdao (CN)

(73) Assignee: Citic Dicastal Co. Ltd., Qinhuangdao (CN)

( * ) Notice: Subject to any disclaimer, the term of this patent is extended or adjusted under 35 U.S.C. 154(b) by 125 days.

(21) Appl. No.: 14/667,517

(22) Filed: Mar. 24, 2015

(65) Prior Publication Data
US 2015/0276542 A1    Oct. 1, 2015

(30) Foreign Application Priority Data

Mar. 25, 2014  (CN) .......................... 2014 1 0113290

(51) Int. Cl.
 *G01M 3/26* (2006.01)
 *G01M 17/02* (2006.01)
 *G01M 3/10* (2006.01)

(52) U.S. Cl.
 CPC ........... *G01M 17/021* (2013.01); *G01M 3/103* (2013.01)

(58) Field of Classification Search
 CPC ......... G01M 3/26; G01M 3/02; G01M 3/3218
 See application file for complete search history.

(56) References Cited

U.S. PATENT DOCUMENTS

| | | | | | |
|---|---|---|---|---|---|
| 3,266,296 | A | * | 8/1966 | Hall ........................ | G01M 3/24 29/894.3 |
| 4,754,638 | A | * | 7/1988 | Brayman ............... | G01M 3/205 73/40.7 |
| 4,813,268 | A | * | 3/1989 | Helvey .................. | G01M 3/205 73/40.7 |
| 4,852,390 | A | * | 8/1989 | Fisch ...................... | G01M 3/24 73/40.5 A |
| 4,991,426 | A | * | 2/1991 | Evans ..................... | G01M 3/24 73/1.05 |
| 5,010,761 | A | * | 4/1991 | Cohen ................... | G01M 3/229 73/40.7 |

(Continued)

FOREIGN PATENT DOCUMENTS

| | | | | |
|---|---|---|---|---|
| DE | 3421258 C1 | * | 8/1985 | .............. G01M 3/20 |
| JP | 58026240 A | * | 2/1983 | |

(Continued)

*Primary Examiner* — David A Rogers
(74) *Attorney, Agent, or Firm* — Platinum Intellectual Property LLP

(57) ABSTRACT

The present invention discloses a rotary wheel airtightness detecting machine which comprises a body frame, an air cylinder, an upper seal, a lower seal, a water tank, an electric motor and a self-made air cylinder, etc. During use, the present invention can make the wheel be automatically centered between the upper seal and the lower seal, avoiding severe abrasion of equipment caused by inclination of the upper pressing plate for sealing upon biased positioning of the wheel.

1 Claim, 2 Drawing Sheets

(56) References Cited

U.S. PATENT DOCUMENTS

| | | | | |
|---|---|---|---|---|
| 5,018,381 A | * | 5/1991 | Campos | G01M 3/06 73/45.5 |
| 5,267,468 A | * | 12/1993 | Zoccoletti | G01M 3/26 73/40 |
| 5,431,041 A | * | 7/1995 | Sala | G01M 3/24 73/40 |
| 5,850,036 A | * | 12/1998 | Giromini | G01M 3/226 198/340 |
| 6,330,821 B1 | * | 12/2001 | Arnold | G01M 3/227 73/40 |
| 6,330,822 B1 | * | 12/2001 | Hawk | G01M 3/20 73/40 |
| 6,332,350 B1 | * | 12/2001 | Inoue | G01M 3/20 73/40 |
| 2004/0011117 A1 | * | 1/2004 | Dutt | G01M 17/024 73/48 |
| 2006/0037382 A1 | * | 2/2006 | Falchi | B29D 30/0662 73/40 |
| 2015/0273493 A1 | * | 10/2015 | Xue | B05B 13/0285 239/224 |
| 2016/0184889 A1 | * | 6/2016 | Xue | B22D 17/2236 164/270.1 |
| 2016/0207173 A1 | * | 7/2016 | Liu | B23Q 3/00 |
| 2016/0207174 A1 | * | 7/2016 | Liu | B23Q 3/00 |
| 2016/0223425 A1 | * | 8/2016 | Liu | G01M 3/26 |

FOREIGN PATENT DOCUMENTS

| | | | | |
|---|---|---|---|---|
| JP | 62124433 A | * | 6/1987 | |
| JP | 01020423 A | * | 1/1989 | |

* cited by examiner

ROTARY WHEEL AIRTIGHTNESS DETECTING MACHINE

TECHNICAL FIELD

The present invention relates to an airtightness detecting machine, in particular to a machine for detecting airtightness by water.

BACKGROUND

In the process of manufacturing aluminum alloy wheels, the procedure of detecting airtightness is indispensable, which is directly related to driving safety. Therefore, manufacturers attach great importance to airtightness detecting procedure. Traditional methods for detecting airtightness include both airtightness detecting by water and airtightness detecting by helium gas. However, manufacturers presently use water airtightness machines without any wheel centering device, with the position of wheels being roughly determined only by human eyes. When the conical upper seal presses downward, it has to be inclined to seal the front rim of the wheel tightly, which is extremely apt to wear the equipment. In addition, the traditional water airtightness machines possess no function of rotating the wheel upon detection, making it impossible to conveniently and visually judge whether there is leak at any circumferential position of the wheel.

SUMMARY OF THE INVENTION

The object of the present invention is to provide a wheel airtightness detecting machine, which can automatically center the wheel between the upper and lower seals and possesses the function of rotating the wheel.

To realize the above purposes, the technical solution of the present invention comprises a body frame, first guide pillars, first guide sleeves, a lower platform, a hollow shaft, a bearing block, a cylinder barrel, a spring, a water tank, a piston, a cylinder cover, a cylinder rod, an upper platform, a lower seal, a guide flange, an upper seal, a lower plate, a swivel, an upper plate, second guide pillars, second guide sleeves, a compressing cylinder, a first pulley, a synchronous belt, a second pulley, an electric motor and a lifting cylinder. Four first guide sleeves are fixed on the lower platform and cooperate with four first guide pillars, the upper ends of which are fixed with the water tank. The output rod of the lifting cylinder, which is also fixed on the lower platform, is hinged with the bottom of the water tank. The hollow shaft, the upper end of which is fitted with the upper platform and the lower end of which is fixed with the first pulley, is fixed in the bearing block by means of a bearing. The lower seal is fixed to the upper end of the upper platform.

The cylinder barrel, which is provided at its upper part with vents, is mounted on the upper platform and placed within the hollow shaft. The cylinder rod is connected with the piston with the spring placed under the latter, and the cylinder cover is mounted at the upper part of and within the cylinder barrel. All above components form a self-made air cylinder. In normal state, the spring is compressed and the guide flange on the top end of the cylinder rod is beneath the upper surface of the lower seal, which makes it convenient to clamp the wheel. Compressed air is filled from the lower end of the hollow shaft and enters the inner cavity of the wheel through the vents at the upper part of the cylinder barrel.

The lower end of the lower plate is mounted with the supper seal, and the upper end of the lower plate is mounted with the swivel. The upper plate, the upper end of which is fixed with four second guide pillars, is fixed to the inner ring of the swivel. Four second guide sleeves which cooperate with the second guide pillars are fixed to the top end of the body frame. The output rod of the compressing cylinder, which is also fixed to the top end of the body frame, is hinged with the upper plate.

The electric motor, the output end of which is mounted with the second pulley, is installed on the side of the body frame and drives the first pulley and the hollow shaft to rotate by means of the synchronous belt.

In practical use, firstly the wheel is placed on the upper end of the lower seal, the A port of the self-made air cylinder is stopped from supplying air, the spring urges the guide flange to lift the wheel from below and the guide portion on the top end of the guide flange centers the wheel at the same time. The compressing cylinder drives the upper seal to press toward the front rim of the wheel with the aid of the second guide pillars, and at the same time the A port of the self-made air cylinder is filled with compressed air so that the piston drags the cylinder rod and the guide flange downward. The lifting cylinder raises the water tank to immerse the wheel with the aid of the first guide pillars. Compressed air is filled from the lower end of the hollow shaft and enters the inner cavity of the wheel through vents at the upper part of the cylinder barrel, and the pressure is held for a certain period. At the same time, the electric motor drives the hollow shaft and the wheel to rotate by means of the synchronous belt, and then the airtightness can be judged by observing whether there is a bubble.

During use, the present invention can make the wheel be automatically centered between the upper seal and the lower seal, avoiding severe abrasion of equipment caused by inclination of the upper pressing plate for sealing upon biased positioning of the wheel. In addition, by rotating the wheel, the present invention makes it possible to conveniently and visually judge whether there is leak at any circumferential position of the wheel, and meanwhile possesses such characteristics as high degree of automation, sophisticated processing, safe and stable performance, etc.

Figure 1:
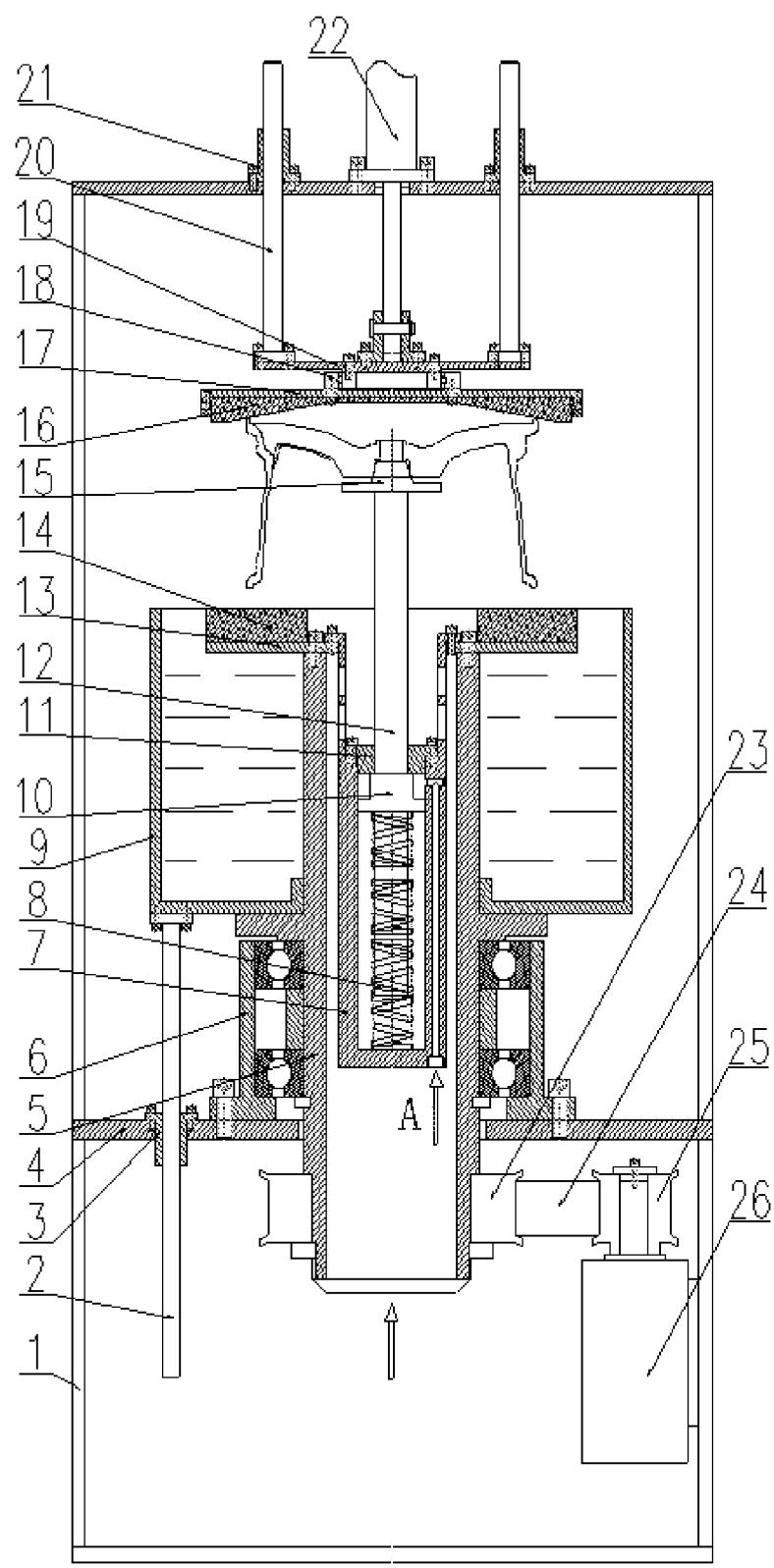
FIG. 1 is a front view of a rotary wheel airtightness detecting machine according to the present invention.
Figure 2:
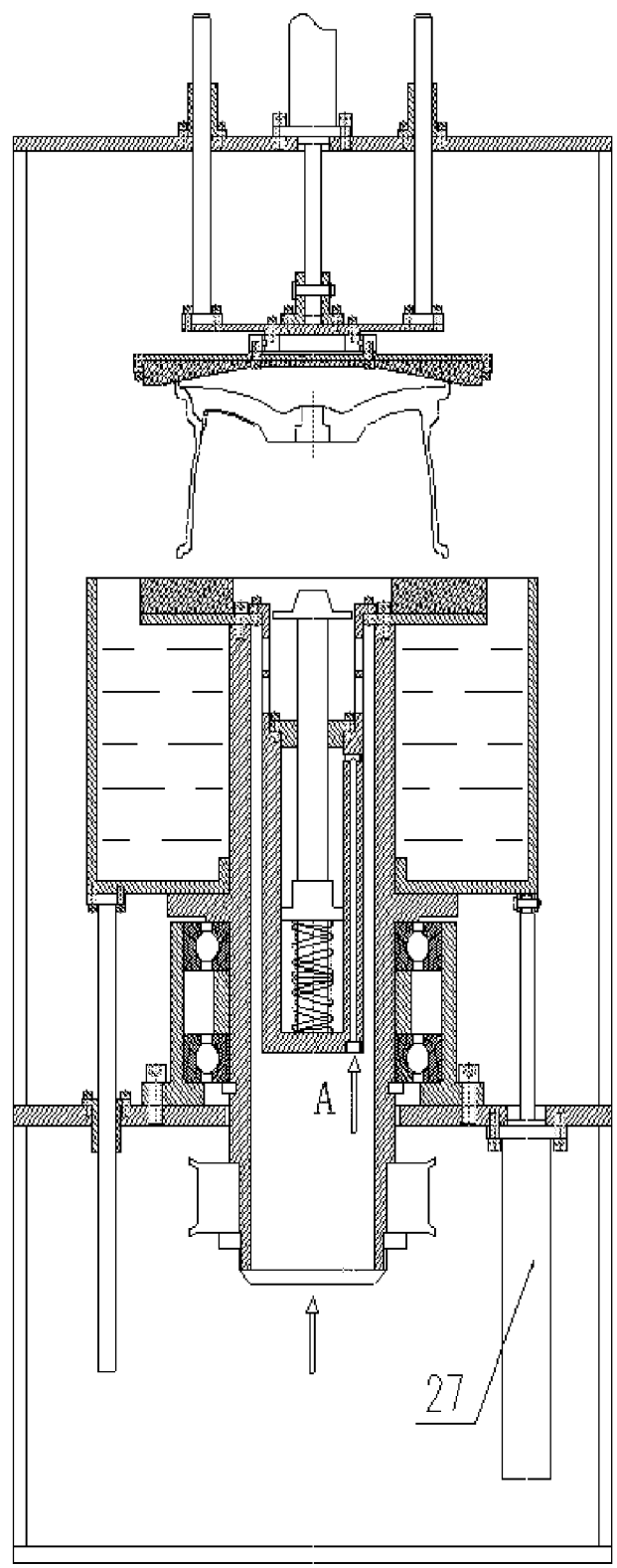
FIG. 2 is a left view of the rotary wheel airtightness detecting machine according to the present invention.

In the drawings, the reference numbers represent the following components respectively: 1-body frame, 2-first guide pillar, 3-first guide sleeve, 4-lower platform, 5-hollow shaft, 6-bearing block, 7-cylinder barrel, 8-spring, 9-water tank, 10-piston, 11-cylinder cover, 12-cylinder rod, 13-upper platform, 14-lower seal, 15-guide flange, 16-upper seal, 17-lower plate, 18-swivel, 19-upper plate, 20-second guide pillar, 21-second guide sleeve, 22-compressing cylinder, 23-first pulley, 24-synchronous belt, 25-second pulley, 26-electric motor, 27-lifting cylinder.

DETAILED EMBODIMENTS

The details and operations of the specific device proposed by the present invention will now be described in conjunction with the drawings.

The device comprises a body frame 1, first guide pillars 2, first guide sleeves 3, a lower platform 4, a hollow shaft 5, a bearing block 6, a cylinder barrel 7, a spring 8, a water tank 9, a piston 10, a cylinder cover 11, a cylinder rod 12, an upper platform 13, a lower seal 14, a guide flange 15, an upper seal 16, a lower plate 17, a swivel 18, an upper plate 19, second guide pillars 20, second guide sleeves 21, a compressing cylinder 22, a first pulley 23, a synchronous belt 24, a second pulley 25, an electric motor 26 and a lifting cylinder 27. Four first guide sleeves 3 are fixed on the lower platform 4 and cooperate with four first guide pillars 2, the upper ends of which are fixed with the water tank 9. The output rod of the lifting cylinder 27, which is also fixed on the lower platform 4, is hinged with the bottom of the water tank 9. The hollow shaft 5, the upper end of which is fitted with the upper platform 13 and the lower end of which is fixed with the first pulley 23, is fixed in the bearing block 6 by means of a bearing. The lower seal 14 is fixed to the upper end of the upper platform 13.

The cylinder barrel 7, which is provided at its upper part with vents, is mounted on the upper platform 13 and placed within the hollow shaft 5. The cylinder rod 12 is connected with the piston 10 with the spring 8 under the latter, the cylinder cover 11 is mounted at the upper part of the cylinder barrel 7. All above components form a self-made air cylinder. In normal state, the spring 8 is compressed and the guide flange 15 on the top end of the cylinder rod 12 is beneath the upper surface of the lower seal 14, which makes it convenient to clamp the wheel. Compressed air is filled from the lower end of the hollow shaft and enters the inner cavity of the wheel through the vents at the upper part of the cylinder barrel 7.

The lower end of the lower plate 17 is mounted with the supper seal 16, and the upper end of the lower plate 17 is mounted with the swivel 18. The upper plate 19, the upper end of which is fixed with four second guide pillars 20, is fixed to the inner ring of the swivel 18. Four second guide sleeves 21 which cooperate with the second guide pillars 20 are fixed to the top end of the body frame 1. The output rod of the compressing cylinder 22, which is also fixed to the top end of the body frame 1, is hinged with the upper plate 19.

The electric motor 26, the output end of which is mounted with the second pulley 25, is installed on the side of the body frame 1 and drives the first pulley 23 and the hollow shaft 5 to rotate by means of the synchronous belt 24.

In operation, the wheel is firstly placed on the upper end of the lower seal 14, the A port of the self-made air cylinder is stopped from supplying air, the spring 8 urges the guide flange 15 to lift the wheel from below and the guide portion on the top end of the guide flange 15 centers the wheel at the same time. The compressing cylinder 22 drives the upper seal 16 to press toward the front rim of the wheel with the aid of the second guide pillars 20, and at the same time the A port of the self-made air cylinder is filled with compressed air so that the piston 10 drags the cylinder rod 12 and the guide flange 15 downward. The lifting cylinder 27 raises the water tank 9 to immerse the wheel with the aid of the first guide pillars 2. Compressed air is filled from the lower end of the hollow shaft 5 and enters the inner cavity of the wheel through vents at the upper part of the cylinder barrel 7, and the pressure is held for a certain period. At the same time, the electric motor 26 drives the hollow shaft 5 and the wheel to rotate by means of the synchronous belt 24, and then the airtightness can be judged by observing whether there is a bubble.

The invention claimed is:

1. A rotary wheel airtightness detecting machine comprising a body frame (1), first guide pillars (2), first guide sleeves (3), a lower platform (4), a hollow shaft (5), a bearing block (6), a cylinder barrel (7), a spring (8), a water tank (9), a piston (10), a cylinder cover (11), a cylinder rod (12), an upper platform (13), a lower seal (14), a guide flange (15), an upper seal (16), a lower plate (17), a swivel (18), an upper plate (19), second guide pillars (20), second guide sleeves (21), a compressing cylinder (22), a first pulley (23), a synchronous belt (24), a second pulley (25), an electric motor (26) and a lifting cylinder (27), characterized in that four first guide sleeves (3) are fixed on the lower platform (4) and cooperate with four first guide pillars (2), the upper ends of which are fixed with the water tank (9); the output rod of the lifting cylinder (27), which is also fixed on the lower platform (4), is hinged with the bottom of the water tank (9); the hollow shaft (5), the upper end of which is fitted with the upper platform (13) and the lower end of which is fixed with the first pulley (23), is fixed in the bearing block (6) by means of a bearing; the lower seal (14) is fixed to the upper end of the upper platform (13);

the cylinder barrel (7), which is provided at its upper part with vents, is mounted on the upper platform (13) and placed within the hollow shaft (5); the cylinder rod (12) is connected with the piston (10) with the spring (8) under the latter, the cylinder cover (11) is mounted at the upper part of and within the cylinder barrel (7), all above components form a self-made air cylinder; in normal state, the spring (8) is compressed and the guide flange (15) on the top end of the cylinder rod (12) is beneath the upper surface of the lower seal (14), which makes it convenient to clamp the wheel;

the lower end of the lower plate (17) is mounted with the upper seal (16), and the upper end of the lower plate (17) is mounted with the swivel (18); the upper plate (19), the upper end of which is fixed with four second guide pillars (20), is fixed to the inner ring of the swivel (18); four second guide sleeves (21) which cooperate with the second guide pillars (20) are fixed to the top end of the body frame (1); the output rod of the compressing cylinder (22), which is also fixed to the top end of the body frame (1), is hinged with the upper plate (19);

the electric motor (26), the output end of which is mounted with the second pulley (25), is installed on the side of the body frame (1) and drives the first pulley (23) and the hollow shaft (5) to rotate by means of the synchronous belt (24).

\* \* \* \* \*